Oct. 15, 1946.　　　F. J. METZGER　　　2,409,441
PRODUCTION OF GLYCOLS
Filed May 7, 1943
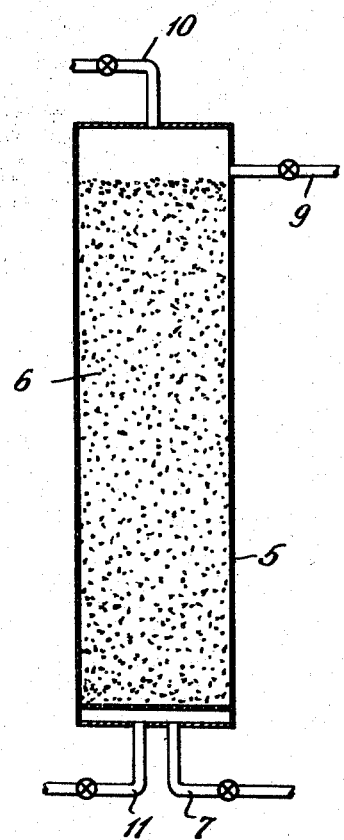
INVENTOR.
Floyd J. Metzger
BY
ATTORNEYS Patented Oct. 15, 1946

2,409,441

UNITED STATES PATENT OFFICE 2,409,441

PRODUCTION OF GLYCOLS

Floyd J. Metzger, New York, N. Y., assignor, by mesne assignments, to U. S. Industrial Chemicals, Inc., New York, N. Y., a corporation of Delaware Application May 7, 1943, Serial No. 486,057

3 Claims. (Cl. 260—635)

This invention relates to the recovery of glycols from solutions resulting from the hydration of aqueous solutions of olefin oxides in the presence of an acid catalyst and particularly to the elimination of complex compounds of the glycol with the acid which are formed during the hydration.

As an example of the application of the invention, it will be described with reference to the production of ethylene glycol by hydration of ethylene oxide as set forth in the patent to Frederick R. Balcar No. 2,135,271. The same procedure may be utilized, however, in the production of other glycols.

In the Balcar procedure, ethylene oxide is dissolved in water containing an acid hydration catalyst, preferably sulphuric acid in the proportion of about ½% of the weight of the solution. The solution is subjected to heating for a period of about thirty minutes at a sufficiently elevated temperature to convert the ethylene oxide to ethylene glycol. A temperature of about 30°–40° C. is usually employed.

The continuous production of ethylene glycol by the procedure described produces an aqueous solution of glycol containing the acid used as the catalyst. The solution is continuously withdrawn from the conversion chamber. The recovery of the glycol from the solution presents considerable difficulty. Some of the acid catalyst is present as such in the solution. The remainder is combined in some manner, not fully known, with the glycol. It cannot be titrated as free acid and is not precipitated by the addition of barium chloride.

Owing to the presence of the combined acid, it has been necessary to follow a complicated and expensive method to remove the acid from the glycol solution. This involves treating the solution with an excess of caustic soda and heating at an elevated temperature for a considerable period. Thereafter, the excess alkali must be neutralized with additional acid. The consumption of alkali and acid is considerable.

The solution, then containing sodium sulphate, is evaporated in a triple-effect evaporator to remove the water in stages and is finally treated in a vacuum distillation apparatus to vaporize and recondense the glycol. As evaporation proceeds, the concentration of sodium sulphate increases to the limit of solubility, after which it precipitates as solid sodium sulphate. The salt is deposited in increasing amounts in the latter stages of evaporation, and finally in the vacuum distillation equipment. This, of course, is undesirable because it may result in stoppage of pipes and valves and by depositing on heating coils may interfere with the transfer of heat. Frequent shut-downs are required to remove the salt, and filtration is necessary to separate the salt from the glycol. Complete separation is never possible, and some loss of glycol results. The various operations and losses add to the operating cost.

It is the object of the present invention to avoid the difficulties mentioned and to afford a simple, efficient and economical procedure whereby the glycol can be recovered without resort to the complicated treatment hereinbefore described.

Another object of the invention is the provision of a satisfactory procedure whereby both free acid and combined acid are easily separated from the glycol solution, which may be evaporated and distilled, if necessary, without the disadvantage of salt deposits during the operation.

Other objects and advantages of the invention will be apparent as it is better understood by reference to the following specification and accompanying drawing, which illustrates diagrammatically an apparatus suitable for the practice of the invention.

I have discovered that the complex compound of glycol with an acid, which is produced during the hydration of aqueous solutions of an olefin oxide and is not amenable to simple neutralization with an alkali, can be broken down and that the acid thus released can be separated, together with free acid originally present, by the simple procedure hereinafter described. The desired result is accomplished by subjecting the glycol solution to an anion adsorbing resin of which several types are available. Such resins have been used heretofore to separate free acids from solutions, but it has not been known that the combination of glycol with an acid in the form herein described is amenable to the anion adsorption activity of resins.

In carrying out the invention, I may use any resin of the anion adsorption type. Several are known, and it will suffice to mention two which are commercially available. These resins are in general the product of condensation of organic amines or similar basic materials with formaldehyde. One known as "Anex" is believed to be a melamine resin, since it contains about 33% of nitrogen. The other, "Amberlite IR-4" is the product of condensation of aromatic amines such as aniline with formaldehyde. The invention is not limited to the use of these particular products, as any resin having anion adsorption activity can be used to accomplish the purpose.

For the purpose of the invention, a simple apparatus may be used. It may consist of a column 5 in which a deep bed 6 of the resin is supported. The resin may be in the form of particles ranging in size from 16 to 50 mesh, although larger or smaller particles may be used. A pipe 7 is connected to the bottom of the column to permit the introduction of the glycol solution which escapes through a pipe 9 at the top. Suitable connections 10 and 11 may be provided to permit the introduction of water and the regeneration solution when necessary.

The glycol solution is introduced and caused to flow through the bed of resin at a relatively low rate such that when the solution leaves the apparatus it will contain no free or combined acid. Operation is preferably at normal room temperature, i. e., 70° F., although the temperature is not critical except with reference to elevated temperatures. When the resin has lost its adsorption power as shown by the appearance of acid in the effluent, it may be regenerated by first flushing the bed with water to eliminate the glycol solution and then introducing an aqueous solution of sodium carbonate, preferably 2%–4% by weight. The resin is then rinsed with water and is ready for further use.

The glycol solution, free from acid, and particularly acid in combination with the glycol, may be delivered to the multiple effect evaporator and, after concentration, may be distilled to recover the glycol. Since no alkali is introduced, the solution is free from sodium sulphate and consequently no difficulty is met with deposits in the evaporating and distillation system. Moreover, since the solution is free from acid and salt, a marketable glycol may be obtained merely by evaporation and without the necessary step of distillation.

The procedure avoids much of the expense heretofore incident to the recovery of glycol from solutions in which it is formed by catalytic hydration. It is simple and more efficient, involving only the use of inexpensive equipment.

Various changes may be made in the apparatus without departing from the invention or sacrificing the advantages thereof.

I claim:

1. The method of converting an olefin oxide to the corresponding glycol, which comprises dissolving the olefin oxide in water containing an acid hydration catalyst that forms a non-titratable acid complex with the glycol, maintaining the resulting solution under conditions favorable for hydration of the dissolved olefin oxide to the corresponding glycol, and subsequently treating the glycol solution with an anion adsorbing resin to break down the glycol-acid complex with liberation of the acid and to remove the free acid from the solution.

2. The method of liberating the acid from the non-titratable glycol-acid complex formed during the hydration of an aqueous solution of the corresponding olefin oxide in the presence of an acid hydration catalyst that forms such a complex with the glycol and removing the free acid from the resulting glycol solution, which comprises passing the aqueous glycol solution through a bed of anion adsorbing resin.

3. The method of liberating sulphuric acid from the non-titratable ethylene glycol-sulphuric acid complex present in the aqueous solution resulting from the hydration of ethylene oxide in the presence of sulphuric acid, which comprises passing the aqueous solution of ethylene glycol through a bed of an anion adsorbing resin.

FLOYD J. METZGER.